(12) United States Patent      (10) Patent No.: US 12,121,018 B2
Heffington      (45) Date of Patent: Oct. 22, 2024

(54) LIQUID LURE DISPENSER

(71) Applicant: Donald R. Heffington, Butte, MT (US)

(72) Inventor: Donald R. Heffington, Butte, MT (US)

( * ) Notice: Subject to any disclaimer, the term of this patent is extended or adjusted under 35 U.S.C. 154(b) by 281 days.

(21) Appl. No.: 17/835,316

(22) Filed: Jun. 8, 2022

(65) Prior Publication Data

US 2023/0397599 A1     Dec. 14, 2023

(51) Int. Cl.
 *A01M 31/00*      (2006.01)

(52) U.S. Cl.
 CPC .................................. *A01M 31/008* (2013.01)

(58) Field of Classification Search
 CPC .................................................... A01M 31/008
 See application file for complete search history.

(56) References Cited

U.S. PATENT DOCUMENTS

| | | | | |
|---|---|---|---|---|
| 2,966,886 | A * | 1/1961 | Perkins ..................... | A01K 7/06 119/71 |
| 4,506,806 | A * | 3/1985 | Lincoln ................. | A01M 29/12 119/711 |
| 5,154,138 | A * | 10/1992 | Siddiqui ............ | A01K 39/0213 251/339 |
| 5,801,737 | A * | 9/1998 | Sato ..................... | B41J 2/17513 347/86 |
| 6,192,945 | B1 * | 2/2001 | Ford ...................... | G01N 1/312 141/2 |
| 6,820,363 | B1 | 11/2004 | Averette, Jr. | |
| 7,690,540 | B1 * | 4/2010 | Owens ................ | A01M 31/008 222/642 |
| 8,739,455 | B2 | 6/2014 | Burgeson | |
| 11,241,007 | B2 | 2/2022 | Burgeson et al. | |
| 2009/0307957 | A1 * | 12/2009 | Gass ................... | A01M 31/008 43/1 |
| 2020/0275644 | A1 * | 9/2020 | Delehanty ........... | A01M 31/008 |

\* cited by examiner

*Primary Examiner* — J C Jacyna
(74) *Attorney, Agent, or Firm* — Mitchell J. W. Vap

(57) ABSTRACT

The herein described liquid lure dispenser is a closed chambered device, which is activated by the internal decrease in air pressure due to night-time cooling of ambient air. The enclosed reservoir is partially filled with a liquid. Expulsion of liquid and equalization of pressure within the device is controlled by two sensitive check valves. An upper check valve relieves excess air pressure as the ambient air warms during the day, which prevents fluid from being forced from the device due to increasing pressure build up. In the evening and night, when internal air pressure decreases in response to reduced ambient air temperature, the upper check valve closes. As internal air pressure begins to decrease, a lower check valve is biased to open. As internal pressure decreases, the lower check valve momentarily opens to equalize internal pressure. As the lower check valve opens, a small amount of liquid attractant is dispensed. When the internal pressure is equalized, the lower check valve closes.

17 Claims, 5 Drawing Sheets

LIQUID LURE DISPENSER

CROSS REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The presently disclosed apparatus is in the field of liquid dispensers and specifically air pressure sensitive liquid dispensers. Various liquid dispensers exist in the prior art. In the field of animal research, liquid dispensers are positioned in an animal's habitat and used to dispense a metered amount of liquid attractant in the area of the dispenser. When the liquid attractant is dispensed, the odor of the attractant travels through the air. When the targeted animal detects the dispensed liquid attractant, the animal is lured to the area of the dispenser. Researchers, photographers, and other wildlife enthusiasts use motion activated cameras placed in the area to document and observe animal behavior. Such research allows for the documentation of animal behavior, ranges, and populations, which is important information for agencies to consider as they make decisions and manage public lands.

Liquid dispensers in the prior art are generally comprised of a reservoir containing a liquid attractant and an opening to the environment to allow the liquid attractant to be released. In such simple designs, the liquid attractant is quickly dispersed and must be refilled frequently due to the liquid attractant being completely dispersed or evaporated. Some liquid dispensers attempt to solve this problem by providing a wick soaked with the liquid attractant, which can be retracted into a container to presumably prolong the useable life of the liquid attractant. See Averette, Jr., U.S. Pat. No. 6,820,363. However, retraction of the wick member requires a user to physically manipulate the device. If such a device were placed in a remote area, the required periodic physical manipulation of the device would be impractical. Furthermore, wicks can thy out quickly depending on temperature and air conditions, which renders the device less effective.

Other devices attempt to use positive air pressure built up in a fluid and air-filled container which forces the liquid attractant out of the container when a threshold amount of pressure is built up. See U.S. Pat. Nos. 8,739,455 and 11,241,007. However, such devices have limited means of air pressure equalization. As such these devices would dispense all or most of their liquid attractant on warm days where internal pressure of the device would continue to increase, forcing all the liquid attractant out of the device. Furthermore, any device reliant on positive pressure build up would only be able to dispense liquid during times of warmer ambient temperatures, presumably, daytime. And, during times of cooler relative ambient temperatures, the device would not generate sufficient positive pressure build up to force liquid attractant from the device.

Other liquid dispensers in the prior art attempt to solve the problems of periodic tending to the device to prevent liquid attractant from being dispensed/evaporated too quickly. Such devices generally depend on battery or solar powered motors, which activate to dispense a small amount of liquid attractant. Such devices are effective at metering the amount of liquid attractant dispensed; however, such devices require a power source and utilize mechanical components, which are expensive to manufacture, require maintenance, and/or can fail if exposed to an outdoor environment. Due to the limitations of liquid dispensers in the prior art discussed above, an improved liquid dispenser is provided herein.

BRIEF SUMMARY OF THE INVENTION

The herein described liquid lure dispenser solves the limitations set forth above in the prior art liquid dispensers. The herein described liquid lure dispenser is a closed chambered device, which is activated by the internal decrease in air pressure due to night-time cooling of ambient air. The enclosed reservoir is partially filled with a liquid attractant. Expulsion of liquid attractant and equalization of pressure within the device is controlled by two sensitive check valves. An upper check valve relieves excess air pressure as the ambient air warms during the day. In the evening and night, when internal air pressure decreases in response to reduced ambient air temperature, the upper check valve closes. As internal air pressure decreases, a lower check valve is biased to open. As the internal pressure continues to decrease, the lower check valve momentarily opens to equalize internal pressure. As the lower check valve opens, a small amount of liquid attractant is dispensed. When the internal pressure is equalized, the lower check valve closes. The device is capable of repeating this cycle multiple times during the night.

The number of dispensing/equalization cycles the device goes through each night is controlled by the amount of force applied to the lower check valve. For example adding weight to the lower check valve would increase the amount of negative pressure that must be built up internally before the lower check valve will open to dispense/equalize. Force to the lower check valve could be applied by other means such as a spring mechanism, elastic band, etc. Changing the amount of force on the lower check valve allows for the amount of liquid dispensed each night to be precisely controlled. The herein described liquid lure dispenser is designed for long term use in remote areas. The device can be set to consistently dispense liquid for multiple months without any checking, maintenance, or refilling of the device. As such, the device is superior to other devices for use in remote areas, where frequent checking, maintenance, or refilling of the device is not possible.

DETAILED DESCRIPTION OF THE INVENTION

Figure 1:
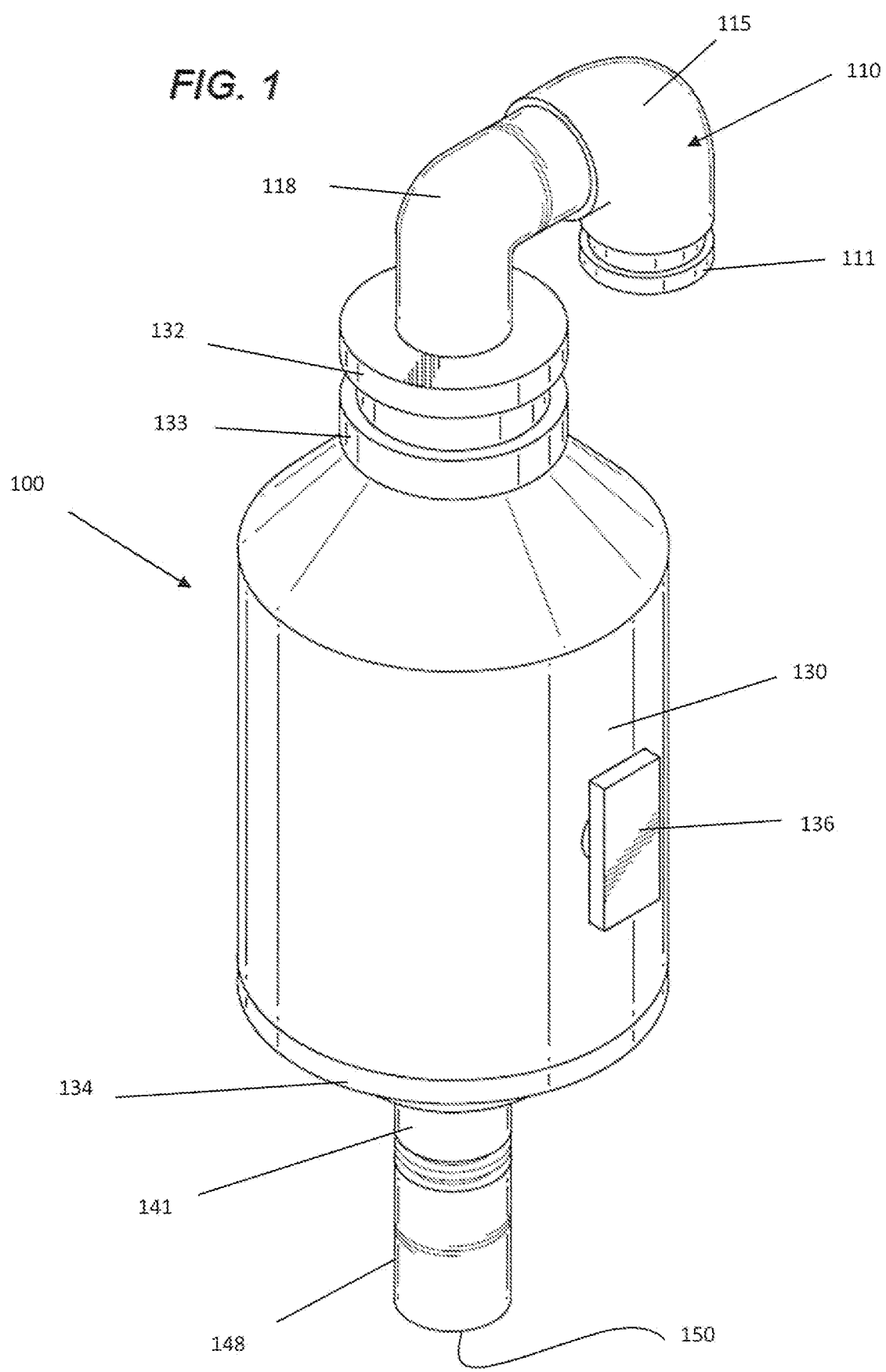
FIG. 1 is a perspective view of the device.
Figure 2:
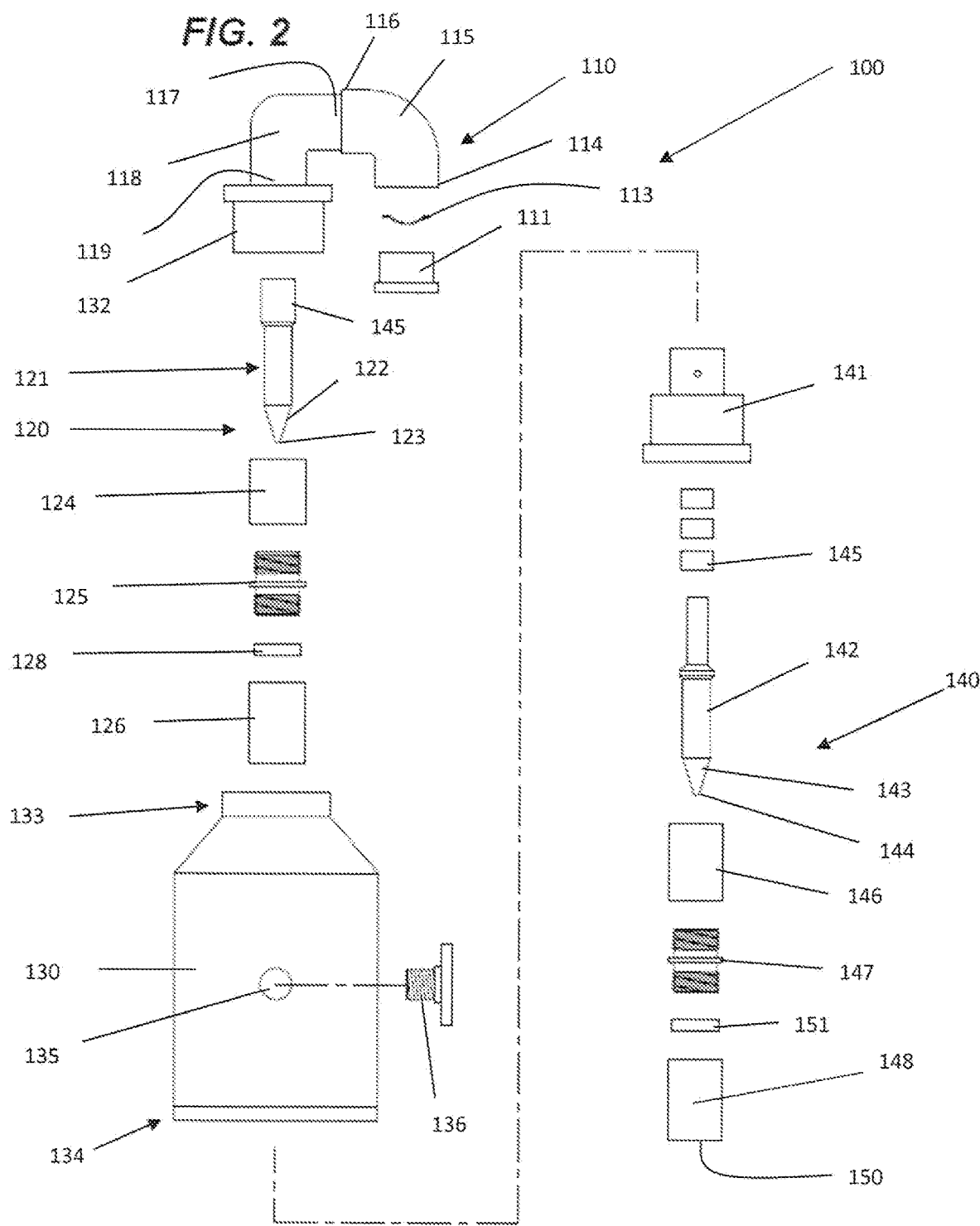
FIG. 2 is an exploded plan view of the device.
Figure 3:
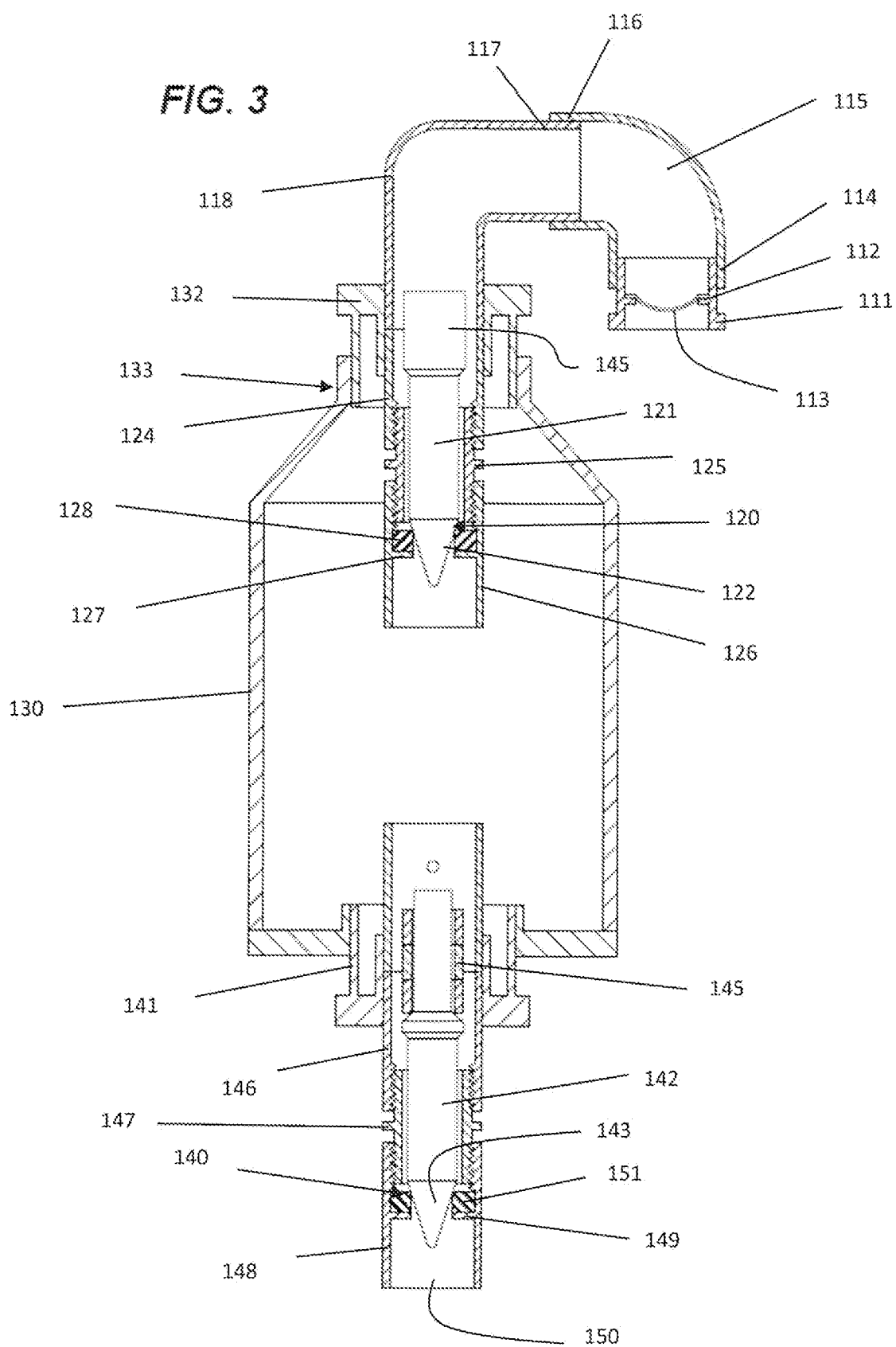
FIG. 3 is a longitudinal section view of the device.

Although only one embodiment of the invention is explained in detail, the figures and explanations should be understood as illustrations only and are not intended to limit the invention in its scope. Also, in describing the embodiment, specific terminology may be used, but it should be understood that specific terms include all technical equivalents that operate in similar manners to accomplish similar purposes.

The herein described liquid lure dispenser 100 is generally comprised of an upper air passage 110, which is in communication with an upper check valve 120 connected to an upper end of a reservoir 130, which is further comprised of a lower check valve 140 connected to a lower end of the reservoir 130. The lower check valve 140 is in communication with the outside air via a connection to a lower release orifice 150.

In general, the device operates as the upper check valve 120 relieves excess air pressure in the reservoir 130 as ambient air warms during the day thus warming the air in the closed reservoir 130 and increasing air pressure within. In the evening and night, when internal air pressure of the reservoir decreases in response to reduced ambient air temperature, the upper check valve 120 closes. As internal air pressure begins to decrease, the lower check valve 140 is biased to open. As internal pressure of the reservoir 130 decreases, the lower check valve 140 momentarily opens to equalize internal pressure of the reservoir 130. As the lower check valve 140 opens, a small amount of liquid attractant 131 is dispensed to the environment through the lower release pipe 150. When the internal pressure of the reservoir 130 is equalized, the lower check valve 130 closes, which again seals the reservoir 130 and prevents further dispensing of liquid attractant 131 until the next time pressure within the reservoir decreases to the threshold required to open the lower check valve 140.

In further detail, the primary embodiment of the liquid lure dispenser 100 is comprised of the following. Said upper air passage 110 is further comprised of a distal end fitting 111 with an interior recess 112, which accepts a screen 113. Said screen 113 allows ambient air communication with the upper check valve 120 while preventing dirt, insects, and other environmental contaminates from entering the device and/or blocking air flow into/out of the device. Said distal end fitting 111 connects to a distal lower end 114 of an air passage 90-degree elbow 115. A proximal upper end 116 of said air passage 90-degree elbow 115 connects to an upper distal end 117 of a reservoir passage 90-degree elbow 118. The components of said upper air passage 110 are generally comprised of compatible PVC pipe components. However, one familiar in the art would recognize that any material with an open interior diameter could be used to effectuate the function of the described components.

A lower proximal end 119 of said reservoir passage 90-degree elbow 118 connects to a reservoir upper adapter 132, which serves as the connection between said upper air passage 110 components and said reservoir 130. Said reservoir upper adapter 132 also serves to house the internal components of the upper check valve 120. Said upper check valve 120 is comprised of an elongated cylinder 121, which tapers 122 to a point 123 at said elongated cylinder's lower end. The upper end of said elongated cylinder is further comprised of a means to increase or decrease the downward force exerted by said elongated cylinder. In the preferred embodiment, said means is a weight 145. However, one familiar in the art would recognize that such means could also comprise a spring, elastic band, or similar means. Said weight 145 can be comprised of material machined directly with said elongated cylinder 121 or can be comprised of removable concentric rings of material such as copper or lead piping. Said concentric rings can be added to or removed from said elongated cylinder 121 to increase or decrease the internal pressure threshold required to open said upper check valve to equalize the internal pressure of said reservoir 130. As such, the device can be set to achieve the desired number of liquid dispensing cycles of the device in a 24 hour period dependent on conditions such as average ambient air temperatures, altitude, etc. Said elongated cylinder 121 can be machined from any material capable of achieving the tapered 122 to a point 123 feature of the upper check valve 120. In the primary embodiment, said elongated cylinder is comprised of polyvinyl chloride.

Figure 4:
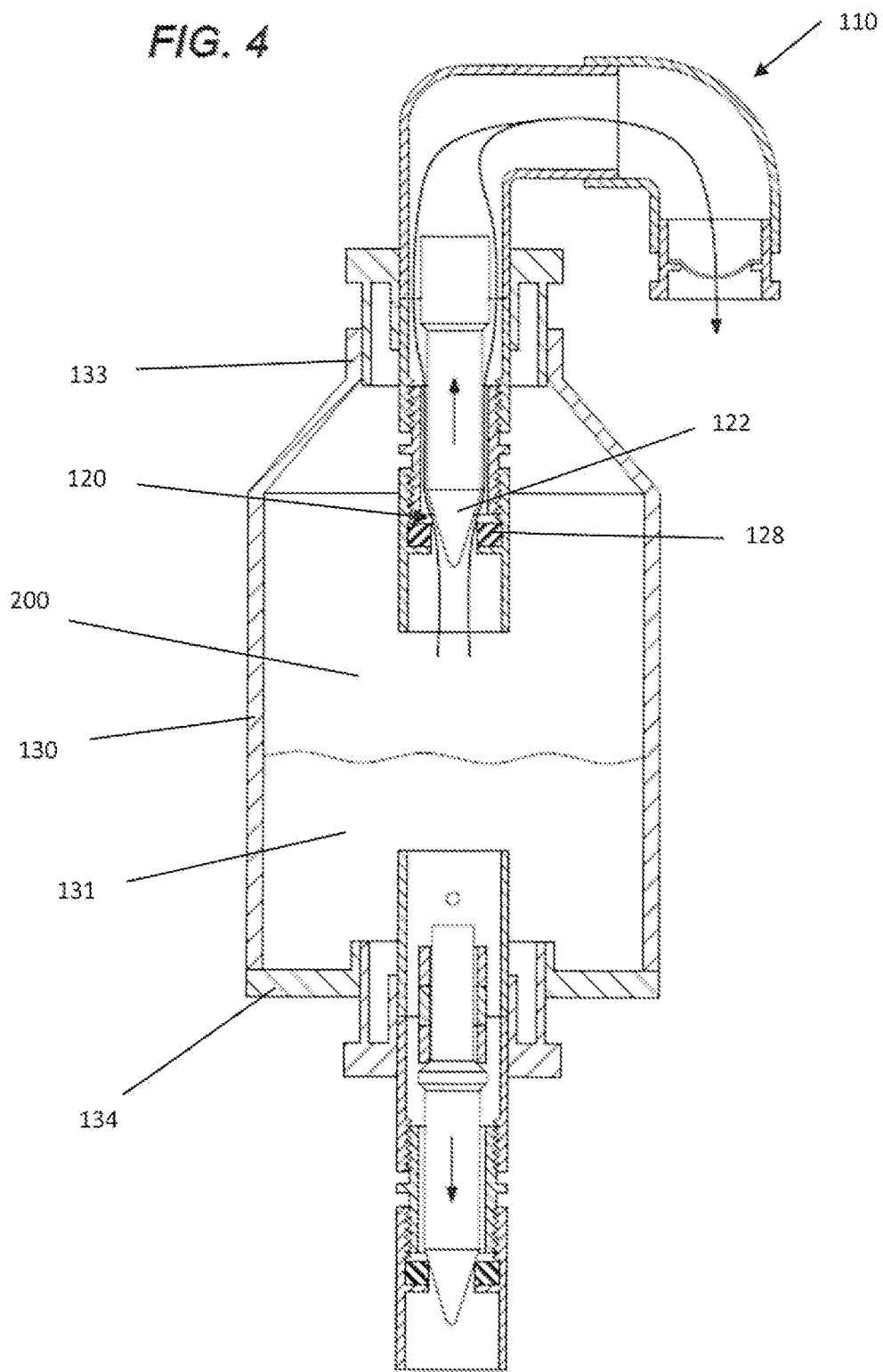
FIG. 4 is a longitudinal section view of the device showing upper check valve releasing increased internal air pressure and lower check valve biased to close.

Said upper check valve 120 elongated cylinder 121 is housed within an upper check valve adapter 124, which connects at its lower end with an upper end of said reservoir adapter 132. A lower end of said upper check valve adapter 124 is comprised of internal threads, which correspond to upper end external threads of an upper check valve reduction adapter 125. Said upper check valve reduction adapter 125 is further comprised of external lower end threads which correspond with internal threads of an upper check valve washer fitting 126. Said upper check valve washer fitting 126 is further comprised of an internal reduction shelf 127 upon which an upper check valve washer 128 sits. The diameter of said upper check valve washer 128 corresponds to the midpoint diameter of said elongated cylinder 121 taper 122. When said weighted upper elongated cylinder 121 tapered portion 122 is seated within said washer 128, said upper check valve 120 is in the closed position. As shown in FIG. 4, when the internal pressure of said reservoir 130 increases due to increasing ambient air temperature and reaches the desired threshold, said elongated cylinder 120 tapered portion is pushed upward thus opening the seal between said elongated cylinder 121 tapered portion 122 and said washer 128, which allows the internal pressure of said reservoir to equalize with the outside air pressure.

At its lower end, said reservoir upper adapter 132 connects to an upper end 133 of said reservoir 130. Said reservoir 130 is a sealed chamber, which contains an amount of liquid attractant 131 and an amount of air 200. The upper end 133 of said reservoir 130 is sealed by said upper check valve 120. A lower end 134 of said reservoir is sealed by said lower check valve 140. Said reservoir 130 is further comprised of a fluid intake 135 where fluid is added to the reservoir 130. Said fluid intake is sealed by a plug 136. Air pressure changes in said reservoir 130 cause the upper check valve 120 and lower check valve 140 to open and close in response to changes in air pressure within the reservoir to effectuate the metered, cyclic fluid release to the environment desired by the user.

The lower end 134 of said reservoir 130 connects to a reservoir lower end adapter 141 which serves as the connection between said lower check valve 140 components and said reservoir 130. Said reservoir lower end adapter 141 also serves to house the internal components of the lower check valve 140. Said lower check valve 140 is comprised of a lower check valve elongated cylinder 142, which tapers 143 to a point 144 at said elongated cylinder's lower end. The upper end of said lower check valve elongated cylinder 142 is further comprised of a means to increase or decrease the downward force exerted by said elongated cylinder 142. In the preferred embodiment, said means is a weight 145 or multiple of said weights. However, one familiar in the art would recognize that such means could also comprise a spring, elastic band, or similar means. Said weight 145 can be comprised of material machined directly with said elongated cylinder 142 or can be comprised of removable concentric rings of material such as copper or lead piping. Said concentric rings can be added to or removed from said elongated cylinder 142 to increase or decrease the negative internal pressure threshold required to open said lower check valve 140 to dispense liquid attractant 131 and equalize the internal pressure of said reservoir 130. As such, the device can be set to achieve the desired number of liquid dispensing cycles of the device in a 24-hour period dependent on conditions such as average ambient air temperatures, altitude, etc. Said elongated cylinder 141 can be machined from any material capable of achieving the tapered 142 to a point 143 feature of the lower check valve 140. In the primary embodiment, said lower check valve elongated cylinder is comprised of polyvinyl chloride.

Figure 5:
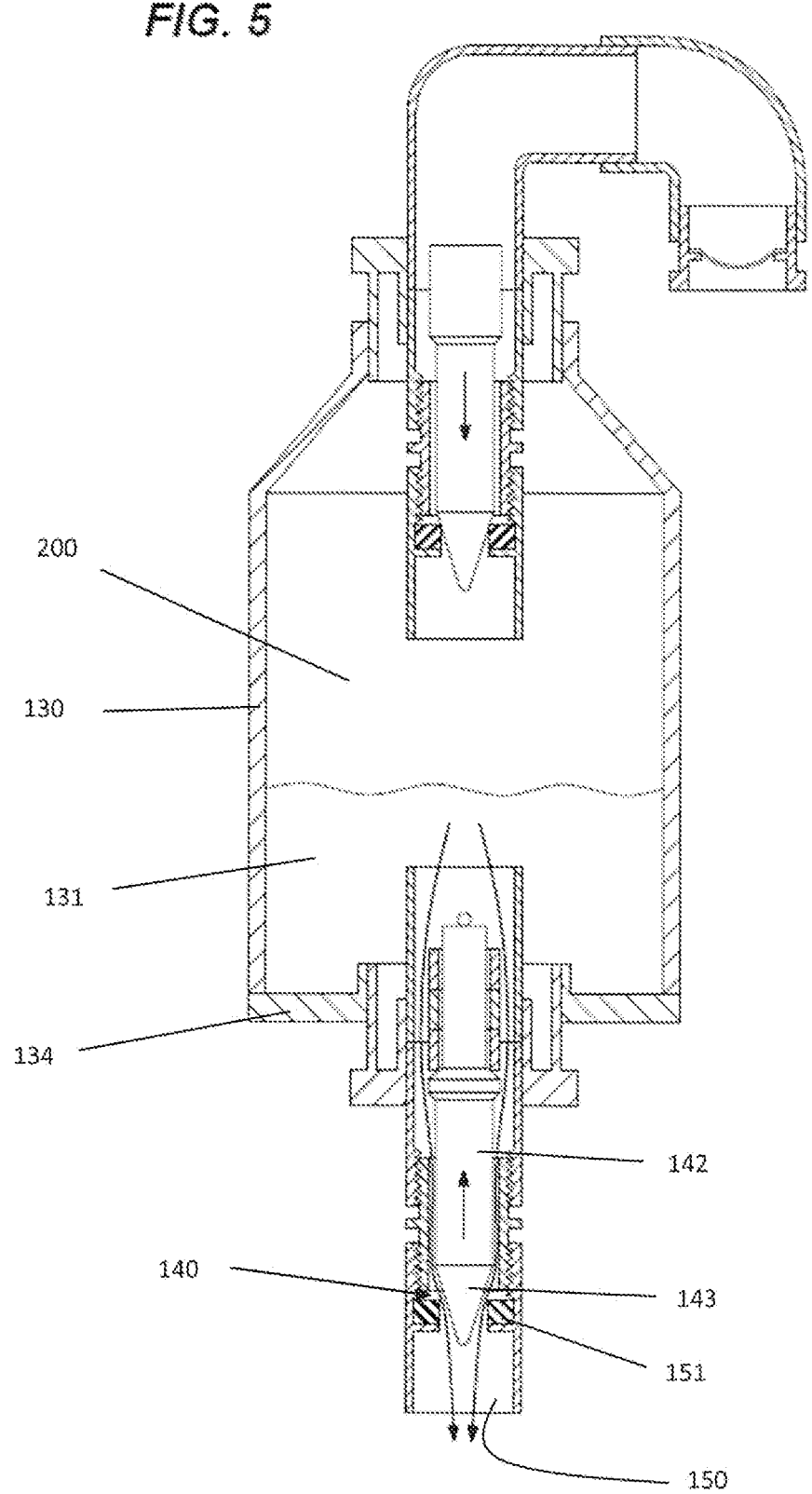
FIG. 5 is a longitudinal section view of the device showing upper check valve biased to close due to decreased internal air pressure and lower check valve biased to open to equalize pressure and dispense fluid.

Said lower check valve 140 elongated cylinder 141 is housed within a lower check valve adapter 146, which connects at its upper end with a bottom end of said reservoir lower end adapter 141. A lower end of said lower check valve adapter 146 is comprised of internal threads, which correspond to upper end external threads of a lower check valve reduction adapter 147. Said lower check valve reduction adapter 147 is further comprised of external lower end threads which correspond with internal threads of a lower check valve washer fitting 148. Said lower check valve washer fitting 148 is further comprised of an internal reduction shelf 149 upon which a lower check valve washer 151 sits. The diameter of said lower check valve washer 151 corresponds to the midpoint diameter of said lower elongated cylinder 142 taper 143. When said weighted lower elongated cylinder 142 tapered portion 143 is seated within said lower check valve washer 151, said lower check valve 140 is in the closed position. As shown in FIG. 5, when the internal pressure of said reservoir 130 decreases due to decreasing ambient air temperature and reaches the desired threshold, said lower elongated cylinder 120 tapered portion is pushed upward due to higher outside air pressure relative to the decreased internal pressure of the reservoir 130, thus opening the seal between said lower elongated cylinder 142 tapered portion 143 and said lower check valve washer 151, which allows for liquid attractant 131 to be released into said lower release orifice 150 into the environment and the internal pressure of said reservoir to equalize once again with the outside air pressure.

It is understood that the foregoing examples are merely illustrative of the present invention. Certain modifications of the articles and/or methods may be made and still achieve the objectives of the invention. Such modifications are contemplated as within the scope of the claimed invention. For example, one skilled in the art would recognize that the invention herein could be comprised of many different configurations, shapes, and sizes to effectuate the invention.

What is claimed is:

1. A liquid lure dispenser comprising: an upper air passage in communication with an upper check valve connected to an upper end of a reservoir, wherein a lower check valve of said reservoir is in communication with outside air; wherein said upper check valve relieves excess air pressure in said reservoir as ambient air warms during the day and as internal pressure of said reservoir decreases, said lower check valve momentarily opens to equalize internal pressure of said reservoir, wherein as the lower check valve opens, a small amount of a liquid within said reservoir is dispensed to said outside air.

2. The liquid lure dispenser of claim 1, wherein said upper air passage is further comprised of a distal end fitting comprised of an interior recess, which accepts a screen.

3. The liquid lure dispenser of claim 2, wherein said distal end fitting connects to a distal lower end of an air passage 90-degree elbow and a proximal upper end of said air passage 90-degree elbow connects to an upper distal end of a reservoir passage 90-degree elbow.

4. The liquid lure dispenser of claim 3, wherein a lower proximal end of said reservoir passage 90-degree elbow connects to a reservoir upper adapter, which serves as the connection between said upper air passage components and said reservoir.

5. The liquid lure dispenser of claim 4, wherein said reservoir upper adapter serves to house the internal components of said upper check valve.

6. The liquid lure dispenser of claim 1, wherein said upper check valve further comprises an elongated cylinder, which tapers to a point at said elongated cylinder's lower end.

7. The liquid lure dispenser of claim 6, wherein said upper check valve is further comprised of a means to increase or decrease the downward force exerted by said elongated cylinder.

8. The liquid lure dispenser of claim 6, wherein said upper check valve elongated cylinder is housed within an upper check valve adapter, which connects at its lower end with an upper end of a reservoir adapter and a lower end of said upper check valve adapter is comprised of internal threads, which correspond to upper end external threads of an upper check valve reduction adapter and said upper check valve reduction adapter is further comprised of external lower end threads which correspond with internal threads of an upper check valve washer fitting and said upper check valve washer fitting is further comprised of an internal reduction shelf upon which an upper check valve washer sits, wherein said upper elongated cylinder tapered portion is seated within said washer.

9. The liquid lure dispenser of claim 8, wherein the diameter of said upper check valve washer corresponds to the midpoint diameter of said elongated cylinder taper.

10. The liquid lure dispenser of claim 1, wherein said reservoir further comprises a sealed chamber, which contains an amount of liquid and an amount of air.

11. The liquid lure dispenser of claim 10, wherein an upper end of said reservoir is sealed by said upper check valve and a lower end of said reservoir is sealed by said lower check valve.

12. The liquid lure dispenser of claim 11, wherein air pressure changes in said reservoir cause said upper check valve and said lower check valve to open and close in response to changes in air pressure within said reservoir.

13. The liquid lure dispenser of claim 1, wherein a lower end of said reservoir connects to a reservoir lower end adapter, which serves as the connection between said lower check valve components and said reservoir.

14. The liquid lure dispenser of claim 1, wherein said lower check valve is further comprised of a lower check valve elongated cylinder, which tapers to a point at said elongated cylinder's lower end.

15. The liquid lure dispenser of claim 14, wherein said lower check valve is further comprised of a means to increase or decrease the downward force exerted by said elongated cylinder.

16. The liquid lure dispenser of claim 14, wherein said lower check valve elongated cylinder is housed within a lower check valve adapter, which connects at its upper end with a bottom end of a reservoir lower end adapter and a lower end of said lower check valve adapter is comprised of internal threads, which correspond to upper end external threads of a lower check valve reduction adapter wherein said lower check valve reduction adapter is further comprised of external lower end threads which correspond with internal threads of a lower check valve washer fitting and said lower check valve washer fitting is further comprised of an internal reduction shelf upon which a lower check valve washer sits, wherein said lower check valve elongated cylinder tapered portion is seated within said washer.

17. The liquid lure dispenser of claim 16, wherein the diameter of said lower check valve washer corresponds to the midpoint diameter of said lower check valve elongated cylinder taper.

\* \* \* \* \*